Patented Mar. 20, 1951

2,545,811

UNITED STATES PATENT OFFICE 2,545,811

PLASTICIZED POLYVINYL RESIN

Stanford J. Hetzel, Cheltenham, Pa., assignor to Sun Oil Company, Philadelphia, Pa., a corporation of New Jersey No Drawing. Application August 25, 1948, Serial No. 46,190

2 Claims. (Cl. 260—31.6)

The present invention relates to a plasticized polyvinyl resin. Specifically it relates to a polyvinyl chloride resin in plasticized composition with 1,5-pentanediol diesters of acids obtained by partial oxidation of kerosene.

In copending application for patent Serial No. 46,185, filed by the instant inventor August 25, 1948, now Patent Number 2,533,250 the foregoing ester and its method of preparation are described and claimed. According to that application the ester was prepared by refluxing in the presence of a trace of an acid catalyst 1,5-pentanediol with kerosene oxidation acids in the presence of a solvent. The ester is there described to have a light-red amber color, a boiling range of 200° C.–250° C. at 4 mm. Hg, a refractive index $N_D^{20°\,C.}$ 1.4888 and a density $D_4^{20°\,C.}$ .9927.

According to the present invention polyvinyl chloride or polyvinyl chloride in admixture with polyvinyl acetate is compounded with the foregoing ester according to the practice usual in the art.

The following example illustrates the invention:

Example

A commercial polyvinyl resin (76.05 grams), known as Geon 101 and composed mainly or wholly of polyvinyl chloride, was mixed together with lead carbonate (1.24 grams) and stearic acid (0.59 gram) in the dry state by ball milling. Fifty-two grams of the plasticizer product of the invention was added in a cake mixer and the mass stirred thoroughly until good mixing was obtained. This mass was then fused on a 3″ x 8″ rubber mill whose rolls were heated to a temperature of about 285° F. The banded material was cut several times from each side and sheeted off at about 0.030 inch to give a rough sheet of about 0.070 inch when cooled. Part of this sheet was remilled to give a thin sheet of about 0.010 inch. Milling times were about 6 minutes and 2 minutes respectively. This thin sheet (0.010″) furnished material for volatility and water extraction tests. After five minutes' preheating at 160° C. the rough sheet was molded for 10 minutes at 1500 lbs./sq. in. in a 5¾″ square steel mold to give a smooth sheet about 0.045″ in thickness. This sheet (0.045″) furnished material for tensile strength, modulus, elongation, brittle point, heat stability and Shore hardness tests. Test results were as follows:

| | |
|---|---|
| Volatility (weight loss at 100° C.—3 hours) per cent | 1.23 |
| Water extraction (weight loss in water after 10 days at room temperature per cent | 1.91 |
| Tensile strength (Scott—ASTM D412-41) lbs./sq. in | 2120 |
| Modulus at 300% elongation lbs./sq. in | 1890 |
| Elongation per cent | 355 |
| Brittle point, ° C. | minus 60 |
| Heat stability (time for color change at 160° C.) hours | 6 |
| Shore hardness | 69 |

In copending application for patent Serial No. 183,628, filed by the instant inventor September 7, 1950, there are described and claimed diesters of a 1,5-pentanediol and an aliphatic monocarboxylic acid containing at least 6 carbon atoms, or an aromatic monocarboxylic acid having the carboxyl group joined directly to the aromatic ring; vinyl-type resins plasticized with such diesters are also described and claimed. Such esters and plasticized compositions are not included within the scope of the present invention, which is limited to polyvinyl chloride plasticized with 1,5-pentanediol diesters of acids obtained by partial oxidation of kerosene.

I claim:

1. A process of plasticizing a polyvinyl chloride resin which comprises the step of milling together said resin with, as plasticizers, 1,5-pentanediol diesters of acids obtained by partial oxidation of kerosene.

2. A composition comprising a polyvinyl chloride resin plasticized with 1,5-pentanediol diesters of acids obtained by partial oxidation of kerosene.

STANFORD J. HETZEL.

REFERENCES CITED

The following references are of record in the file of this patent:

UNITED STATES PATENTS

| Number | Name | Date |
|---|---|---|
| 2,339,387 | Endres | Jan. 18, 1944 |
| 2,397,612 | Lycan | Apr. 2, 1946 |